United States Patent
Kong et al.

(10) Patent No.: US 12,072,839 B2
(45) Date of Patent: Aug. 27, 2024

(54) AUTOMATIC FILE ORGANIZATION WITHIN A CLOUD STORAGE SYSTEM

(71) Applicant: GOOGLE LLC, Mountain View, CA (US)

(72) Inventors: Weize Kong, Mountain View, CA (US); Mingyang Zhang, San Jose, CA (US); Michael Bendersky, Cupertino, CA (US); Marc Alexander Najork, Palo Alto, CA (US); Mike Colagrosso, Arvada, CA (US); Brandon Vargo, Boulder, CO (US); Remy Burger, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/544,705

(22) Filed: Dec. 7, 2021

(65) Prior Publication Data
US 2023/0177004 A1 Jun. 8, 2023

(51) Int. Cl.
*G06F 16/11* (2019.01)
*G06F 16/18* (2019.01)

(52) U.S. Cl.
CPC ............ *G06F 16/122* (2019.01); *G06F 16/18* (2019.01)

(58) Field of Classification Search
CPC ................................ G06F 16/122; G06F 16/18
See application file for complete search history.

(56) References Cited

U.S. PATENT DOCUMENTS

| | | | |
|---|---|---|---|
| 9,805,042 B1 * | 10/2017 | Meyer | G06F 16/358 |
| 10,452,993 B1 | 10/2019 | Hart | |
| 2021/0089963 A1 | 3/2021 | Baek | |
| 2021/0359874 A1 * | 11/2021 | Zhuk | G06N 3/045 |

OTHER PUBLICATIONS

Lee, L.H., Rajkumar, R. & Isa, D. Automatic folder allocation system using Bayesian-support vector machines hybrid classification approach. Appl Intell 36, 295-307 (2012). https://doi.org/10.1007/s10489-010-0261-0 (Year: 2010).*
Aggarwal et al., A Survey of Text Clustering Algorithms Mining Text Data, Chapter Four, pp. 78-128.
Malone, Thomas W. "How Do People Organize Their Desks? Implications for the Design of Office Information Systems" ACM Transactions on Office Information Systems, vol. 1, No. 1, Jan. 1983, pp. 99-112.

(Continued)

*Primary Examiner* — Mark D Featherstone
*Assistant Examiner* — Samuel C Sharpless, III
(74) *Attorney, Agent, or Firm* — Gray Ice Higdon

(57) ABSTRACT

Techniques are described herein for enabling more computationally efficient organization of files within a cloud storage system. A method includes: receiving information identifying a document and a set of folders; for each folder in the set of folders, using a trained model to predict a similarity measure between the folder and the document; for each folder in the set of folders, determining a score for the folder based on the predicted similarity measure for the folder; selecting a candidate folder from the set of folders using the scores of the folders within the set of folders; and providing, on a user interface, a selectable option to associate the document with the candidate folder.

19 Claims, 8 Drawing Sheets

(56) References Cited

OTHER PUBLICATIONS

Li et al., "Multi-view Embedding-based Synonyms for Email Search" SIGIR. Jul. 2019. ACM ISBN 978-1-4503-6172-9/19/07. https://doi.org/10.1145/3331184.3331250. 10 pages.

Kong et al., "Learning to Cluster Documents into Workspaces Using Large Scale Activity Logs" KDD. Aug. 2020. ACM ISBN 978-1-4503-7998-4/20/08. https://doi.org/10.1145/3394486.3403291. 9 pages.

Jiang et al., "Semantic Text Matching for Long-Form Documents" International World Wide Web Conference Committee . . . May 2019. ACM ISBN 123-4567-24-567/08/06. https://doi.org/10.475/123_4. 11 pages.

Iyyer et al., Deep Unordered Composition Rivals Syntactic Methods for Text Classification 11 pages.

Hofmann, Thomas "Probabilistic Latent Semantic Analysis" EECS Department, Computer Science Division, University of California, Berkeley & International Computer Science Institute, Berkeley, CA. 8 pages.

Deerwester et al., "Indexing by Latent Semantic Analysis" Journal of the American Society for Information Science. 41 (6):391-407, 1990. 17 pages.

Cohen, William W. "Learning Rules that Classify E-Mail" AAAI Technical Report SS-96-05. 8 pages. 1996.

Blei et al., "Latent Dirichlet Allocation" Journal of Machine Learning Research 3. 2003. pp. 993-1022.

Lee, L.H. et al., "Automatic folder allocation system using Bayesian-support vector machines hybrid classification approach"; Applied Intelligence; The International Journal of Artificial Intelligence, Neural Networks, and Complex Problem-Solving TE, Kluwer Academic Publishers, BO, vol. 36, No. 2; pp. 295-307; dated Oct. 16, 2020.

European Patent Office; International Search Report and Written Opinion issued in Application No. PCT/US2022/050590; 18 pages; dated Mar. 7, 2023.

* cited by examiner

AUTOMATIC FILE ORGANIZATION WITHIN A CLOUD STORAGE SYSTEM

BACKGROUND

A cloud storage system may allow a user to store a large number of files in a network-accessible location. The files stored on the cloud storage system may include word processing documents, presentation (slide) documents, spreadsheet documents, and/or other type(s) of documents. The cloud storage system may also provide for organization of files, e.g., within a folder structure. A user may be able to create multiple folders on the cloud storage system and save or move various files into the folders. A user may name a folder based on, for example, content of files that the user may save or move into the folder. The folder structure may enable a user to more quickly locate and access a desired file.

When a file is created and/or stored in the cloud storage system, if a user does not specify a particular folder, the file may be created/stored in a root folder (e.g., at a top level folder or outside of any folder visible to the user). Over time, as more files are created and/or stored in the cloud storage system, it may become cumbersome and computationally inefficient to locate and access a desired file in the root folder. For example, locating and accessing a desired file in the root folder can require utilization of a client device to browse and/or search among a large quantity of files within the root folder. This can utilize significant resources of the client device, such as power (e.g., battery) resources in powering a display of the client device during the browsing and/or searching. Further, this can utilize significant server-side resources in processing a search query and/or in streaming content to the client device during browsing. Further, it may be difficult to quickly identify a set of related files stored in the root folder of a cloud storage system. Accordingly, utilization of client device and/or server resources can be compounded when browsing and/or searching to identify multiple related files. Yet further, organizing the files into folders manually may be a time consuming process and can utilize significant client device and/or server resources. For example, significant power resources of the client device can be utilized as a user interacts with graphical user interface(s) in manually creating folders, manually locating files to move into such folders, and manually moving (e.g., via drag and drop) the located files into such folders.

SUMMARY

Implementations described herein relate to various techniques to enable more computationally efficient organization of files within a cloud storage system. In various implementations, given a particular file, suggestion(s) are provided (e.g., visually rendered) for folder(s) into which the particular file may be moved. Such suggestion(s) can be quickly reviewed by a user, a given suggestion selected (e.g., via a single-click), and the file automatically added to the folder in response to the selection. In these and other manners a file can be quickly added to an appropriate folder while mitigating utilization of client and/or server resources in doing so. Additionally, in various implementations, given a particular folder, suggestions are provided (e.g., visually rendered) for file(s) which may be moved into the particular folder. Such suggestion(s) can be quickly reviewed by a user, a given suggestion selected (e.g., via a single-click), and the file automatically added to the folder in response to the selection. In these and other manners, folders can be quickly populated with appropriate files while mitigating utilization of client and/or server resources in doing so. These suggestions for folder(s) into which a particular file may be moved and for file(s) which may be moved into a particular folder may be based on a predicted similarity between a file and a folder.

In some implementations, "adding" or "moving" a file into a folder may be accomplished by modifying metadata of the file (e.g., adding a particular flag, or adding/modifying a series of bits that indicate a "location" of the file or a "label" for the file). In other implementations, "adding" or "moving" a file into a folder may be accomplished by modifying an index, table, directory, database, data structure, etc. that indicates folder(s), location(s), label(s), etc. associated with files. These implementations may mitigate utilization of client and/or server resources by allowing for quick access to related files in a folder while avoiding utilization of client and/or server resources to physically move files to different storage locations.

Additionally or alternatively, in some implementations, "adding" or "moving" a file into a folder may include physically moving the file to a different storage location, e.g., to a storage location that is on the same server(s) or geographically proximate server(s) as other files in the folder. These implementations may reduce latency when accessing the files within a particular folder by minimizing accessing of different servers in disparate geographic locations.

In some implementations, suggestion(s) for folder(s) into which a particular file may be moved and for file(s) which may be moved into a particular folder may be determined using scores that are based on predicted similarity measures between files and folders. In some implementations, the scores may be further based on folder weights. For example, folders that have been more recently accessed by a user may be weighted more heavily as compared to folders that have not been accessed as recently. In another example, a number of files in a folder may be used in determining a folder weight (e.g., folders that have fewer files than a first threshold number of files and/or folders that have a larger number of files than a second threshold number of files may be weighted less heavily than other folders).

The predicated similarity measure may be determined using one or more trained models that process one or more folder features of a folder along with one or more file features of a file. In some implementations, when a user accepts a suggestion to automatically add a file to a folder, the acceptance may be used as feedback (e.g., a training label) to retrain the trained model. In some implementations, when a user does not accept a suggestion to automatically add a file to a folder, the non-acceptance may be used as feedback (e.g., a training label) to retrain the trained model. These implementations may mitigate utilization of client and/or server resources by minimizing the presentation of options that are unlikely to be selected by users and by providing more relevant options to users subsequent to retraining of the model(s).

In some implementations, users' folder data in a cloud storage system may be used to train the model(s). The folder data may contain information about users' documents and which folders the documents are stored in. From this data, document-folder pairs may be extracted to train a folder encoder model. Documents may be used to train a document encoder model. In some implementations, the training data may be filtered such that only productivity-type documents (e.g., word processing documents, presentation (slide) documents, spreadsheet documents, etc.) are used.

In some implementations, semantic matching may be used to predict similarity sim(d, f) between a document d and a folder f. In some implementations, sim(d, f) may be used to rank a set of candidate folders for a given document, and may be used to rank a set of candidate documents for a given folder. In some implementations, a Siamese network model architecture may be used for sim(d, f). In this Siamese network architecture, a left network (e.g., the trained document encoder model) may encode the document to a vector representation (d), and a right network (e.g., the trained folder encoder model) may encode the folder to another vector representation (f) of the same dimensionality. Then, sim(d, f) may be computed as the cosine similarity between (d) and (f). The cosine similarity may be scaled as logits.

In some implementations, one or more folders into which a particular file may be moved and/or one or more files which may be moved into a particular folder may be suggested based on scores for the one or more folders or scores for the one or more files satisfying a threshold. In some implementations, suggestion(s) for folder(s) into which a particular file may be moved and for file(s) which may be moved into a particular folder may not be provided in response to scores for the folder(s) or scores for the file(s) not satisfying a threshold.

By selectively providing suggestion(s) for folder(s) into which a particular file may be moved and for file(s) which may be moved into a particular folder (e.g., based on one or more similarity measures or scores for a folder or one or more similarity measures or scores for a file satisfying one or more thresholds), implementations may avoid utilization of computing resources to present options that are less likely to be relevant to a user. In particular, implementations may prevent wasteful rendering of suggestions on a user interface when the suggestions are unlikely to be selected by a user. Additionally, implementations may provide varying numbers of suggestions based on a number of folders or files having scores that satisfy a threshold, further avoiding utilization of computing resources in presenting options that are less likely to be relevant to a user.

In some implementations, a first (e.g., lower) threshold may be used along with a second (e.g., higher) threshold. In response to a score satisfying both the first threshold and the second threshold, an option to associate a file with a folder may be automatically displayed. However, if the score satisfies the first threshold but not the second threshold, the option to associate the file with the folder may be displayed only after receiving a user input that is a request to display the option. This implementation may utilize fewer computing resources by only automatically presenting options that are more likely to be selected by a user.

In various implementations, a method implemented by one or more processors may include: receiving information identifying a document and a set of folders; for each folder in the set of folders, using a trained model to predict a similarity measure between the folder and the document, wherein using the trained model to predict the similarity measure for each folder includes: processing, using the trained model, one or more folder features of the folder along with one or more document features of the document; and generating the similarity measure for the folder based on the processing; for each folder in the set of folders, determining a score for the folder based on the predicted similarity measure for the folder; selecting a candidate folder from the set of folders using the scores of the folders within the set of folders; and providing, on a user interface, a selectable option to associate the document with the candidate folder.

In some implementations, the method may further include receiving an indication of acceptance of the selectable option to associate the document with the candidate folder; and in response to receiving the indication of acceptance of the selectable option to associate the document with the candidate folder, automatically associating the document with the candidate folder. In some implementations, automatically associating the document with the candidate folder includes moving the document into the candidate folder. In some implementations, automatically associating the document with the candidate folder includes applying a label to the document based on the candidate folder.

In some implementations, the method may further include, in response to receiving the indication of acceptance of the option to associate the document with the candidate folder, using the indication of acceptance of the option to associate the document with the candidate folder as feedback to retrain the trained model.

In some implementations, the document and the set of folders are stored on a cloud storage system. In some implementations, processing, using the trained model, the one or more folder features of the folder along with the one or more document features of the document includes: determining a vector representation (embedding) of the document; and determining a vector representation (embedding) of the folder. Generating the similarity measure for the folder based on the processing may include determining a similarity between the vector representation of the document and the vector representation of the folder.

In some implementations, the vector representation of the document and the vector representation of the folder have the same dimensionality. In some implementations, determining the similarity between the vector representation of the document and the vector representation of the folder includes determining a cosine similarity.

In some implementations, selecting the candidate folder from the set of folders using the scores of the folders within the set of folders includes selecting the candidate folder based on the score for the candidate folder satisfying a threshold. In some implementations, the method further includes selecting at least one additional candidate folder from the set of folders based on, for each of the at least one additional candidate folder, the score for the additional candidate folder satisfying the threshold; and providing, on the user interface, for each of the at least one additional candidate folder, a selectable option to associate the document with the additional candidate folder.

In some implementations, the method further includes determining, based on the scores for the folders within the set of folders, an additional candidate folder; and avoiding providing, on the user interface, a selectable option to associate the document with the additional candidate folder based on the score for the additional candidate folder not satisfying a threshold.

In some implementations, providing, on the user interface, the selectable option to associate the document with the candidate folder includes: in response to the score for the candidate folder satisfying a first threshold and satisfying a second threshold, automatically displaying the selectable option to associate the document with the candidate folder; and in response to the score for the candidate folder satisfying the first threshold but not satisfying the second threshold, only displaying the selectable option to associate the document with the candidate folder subsequent to receiving, via the user interface, a user input that is a request to display the selectable option to associate the document with the candidate folder.

In some implementations, providing, on the user interface, the selectable option to associate the document with the candidate folder includes: providing, on the user interface, an indication that an organization suggestion for the document is available; and in response to receiving, via the user interface, a user input that is associated with the indication that the organization suggestion for the document is available, providing the selectable option to associate the document with the candidate folder, wherein the selectable option indicates a name of the candidate folder.

In some additional or alternative implementations, a computer program product may include one or more computer-readable storage media having program instructions collectively stored on the one or more computer-readable storage media. The program instructions may be executable to: receive information identifying a folder and a set of documents; for each document in the set of documents, use a trained model to predict a similarity measure between the document and the folder, wherein using the trained model to predict the similarity measure for each document includes: processing, using the trained model, one or more document features of the document along with one or more folder features of the folder; and generating the similarity measure for the document based on the processing; for each document in the set of documents, determine a score for the document based on the predicted similarity measure for the document; select a candidate document from the set of documents using the scores of the documents within the set of documents; and provide, on a user interface, a selectable option to associate the candidate document with the folder.

In some implementations, the program instructions may be further executable to receive an indication of acceptance of the selectable option to associate the candidate document with the folder; and in response to receiving the indication of acceptance of the selectable option to associate the candidate document with the folder, automatically associate the candidate document with the folder. In some implementations, automatically associating the candidate document with the folder includes moving the candidate document into the folder. In some implementations, automatically associating the candidate document with the folder includes applying a label to the candidate document based on the folder.

In some implementations, the program instructions are further executable to: in response to receiving the indication of acceptance of the option to associate the candidate document with the folder, use the indication of acceptance of the option to associate the candidate document with the folder as feedback to retrain the trained model.

In some additional or alternative implementations, a system may include a processor, a computer-readable memory, one or more computer-readable storage media, and program instructions collectively stored on the one or more computer-readable storage media. The program instructions may be executable to: receive information identifying a document and a set of folders; for each folder in the set of folders, use a trained model to predict a similarity measure between the folder and the document, wherein using the trained model to predict the similarity measure for each folder includes: processing, using the trained model, one or more folder features of the folder along with one or more document features of the document; and generating the similarity measure for the folder based on the processing; for each folder in the set of folders, determine a score for the folder based on the predicted similarity measure for the folder; select a candidate folder from the set of folders using the scores of the folders within the set of folders; and provide, on a user interface, a selectable option to associate the document with the candidate folder.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
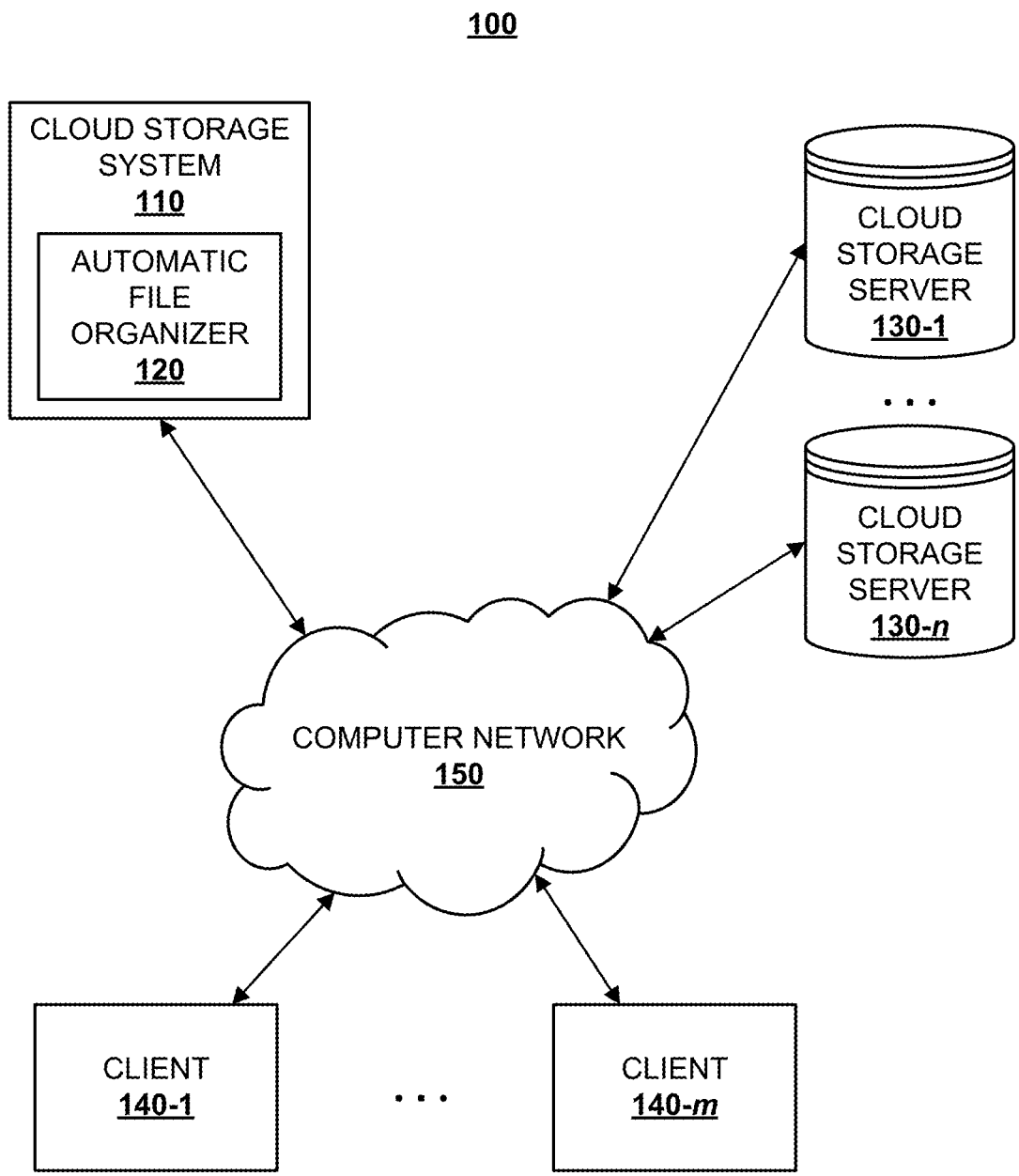
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a cloud storage system 110, may be implemented using one or more server computing devices that form what is sometimes referred to as a "cloud infrastructure," although this is not required.

In implementations, the environment 100 may include a cloud storage system 110 that implements a cloud storage application that is accessible from various clients, including clients 140-1, . . . , 140-m that may be included in the environment 100, through either a thin client interface, such as a web browser (e.g., a web-based cloud storage application), or a program interface. In implementations, the cloud storage application that is implemented by the cloud storage system 110 may be a software as a service (Saas) cloud storage application. The cloud storage system 110 and the clients 140-1, . . . , **140-*m* may be in communication via a computer network 150, which may be any suitable network including any combination of a local area network (LAN), wide area network (WAN), or the Internet. The cloud storage system 110 may include, among other things, an automatic file organizer 120 that is configured to perform selected aspects of the present disclosure in order to enable more computationally efficient organization of files that are created, stored, accessed, and/or modified using one or more of the clients 140-1, . . . , 140-*m*. Additionally, the cloud storage system 110** may reduce cognitive load via automation of the organization of files (e.g., by automatically providing suggestions, given a particular file, for one or more folders into which the particular file may be moved, and/or by automatically providing suggestions, given a particular folder, for one or more files that may be moved into the particular folder).

Each of the clients 140-1, . . . , **140-*m* may be, for example, a user computing device that is used by a user to access a cloud storage application via a cloud storage application user interface, such as a SaaS cloud storage application, that is provided by the cloud storage system 110, e.g., through a web browser. In an example, the clients 140-1, . . . , 140-*m*** may be user computing devices associated with an individual or an entity or organization such as a business (e.g., financial institute, bank, etc.), non-profit, club, university, government agency, or any other organization that uses a cloud storage application. For example, a business may operate a cloud storage application to create, store, access, and/or modify one or more files to manage financial records, business records, client lists, and so forth.

In various implementations, the environment 100 may include cloud storage servers 130-1, . . . , **130-*n*. Files that are created, stored, accessed, and/or modified by one or more of the clients 140-1, . . . , 140-*m* using the cloud storage application that is implemented by the cloud storage system 110 may be stored in the cloud storage system 110 and/or in one or more of the cloud storage servers 130-1, . . . , 130-*n*. In some implementations, the cloud storage servers 130-1, . . . , 130-*n* along with the cloud storage system 110 may form a distributed storage system, and the cloud storage system 110 may create a plurality of data slices from a single file, and divide up the slices from the single file to be stored across different cloud storage servers 130-1, . . . , 130-*n*. Upon receipt of a request to access the file, the cloud storage system 110 may retrieve the slices from the cloud storage servers 130-1, . . . , 130-*n* and reassemble the file from the slices. In some implementations, the distributed storage system may provide a degree of redundancy and fault tolerance, such that fewer than all of the slices may be reassembled into the file. Accordingly, the risk of data loss may be minimized, even in a case where one of the cloud storage servers 130-1, . . . , 130-*n*** has a failure or is otherwise inaccessible.

The automatic file organizer 120 may be configured to enable more computationally efficient organization of files, in the cloud storage system 110, that are created, stored, accessed, and/or modified using one or more of the clients 140-1, . . . , **140-*m*. For example, the automatic file organizer 120 may, given a particular file, be configured to provide suggestion(s) for folder(s) into which the particular file may be moved. These suggestion(s) may be provided responsive to the particular file being displayed on and/or selected via a user interface of one of the clients 140-1, . . . , 140-*m* or may be provided responsive to an interaction (e.g., a long tap, or a right click and subsequent selection of a context menu item) with the particular file via a user interface of one of the clients 140-1, . . . , 140-*m*. These suggestion(s) may be visually rendered on a user interface of one of the clients 140-1, . . . , 140-*m*. Such suggestion(s) can be quickly reviewed by a user via the user interface of one of the clients 140-1, . . . , 140-*m*, a given suggestion selected (e.g., via a single-click on the user interface of one of the clients 140-1, . . . , 140-*m*), and the file automatically added to the folder, by the automatic file organizer 120**, in response to the selection.

Additionally, the automatic file organizer 120 may, given a particular folder, be configured to provide suggestions for file(s) which may be moved into the particular folder. These suggestion(s) may be provided responsive to the particular folder being displayed on and/or selected via a user interface of one of the clients 140-1, . . . , **140-*m* or may be provided responsive to an interaction (e.g., a long tap, or a right click and subsequent selection of a context menu item) with the particular folder via a user interface of one of the clients 140-1, . . . , 140-*m*. These suggestion(s) may be visually rendered on a user interface of one of the clients 140-1, . . . , 140-*m*. Such suggestion(s) can be quickly reviewed by a user via the user interface of one of the clients 140-1, . . . , 140-*m*, a given suggestion selected (e.g., via a single-click on the user interface of one of the clients 140-1, . . . , 140-*m***), and the file automatically added to the folder in response to the selection.

Figure 2:
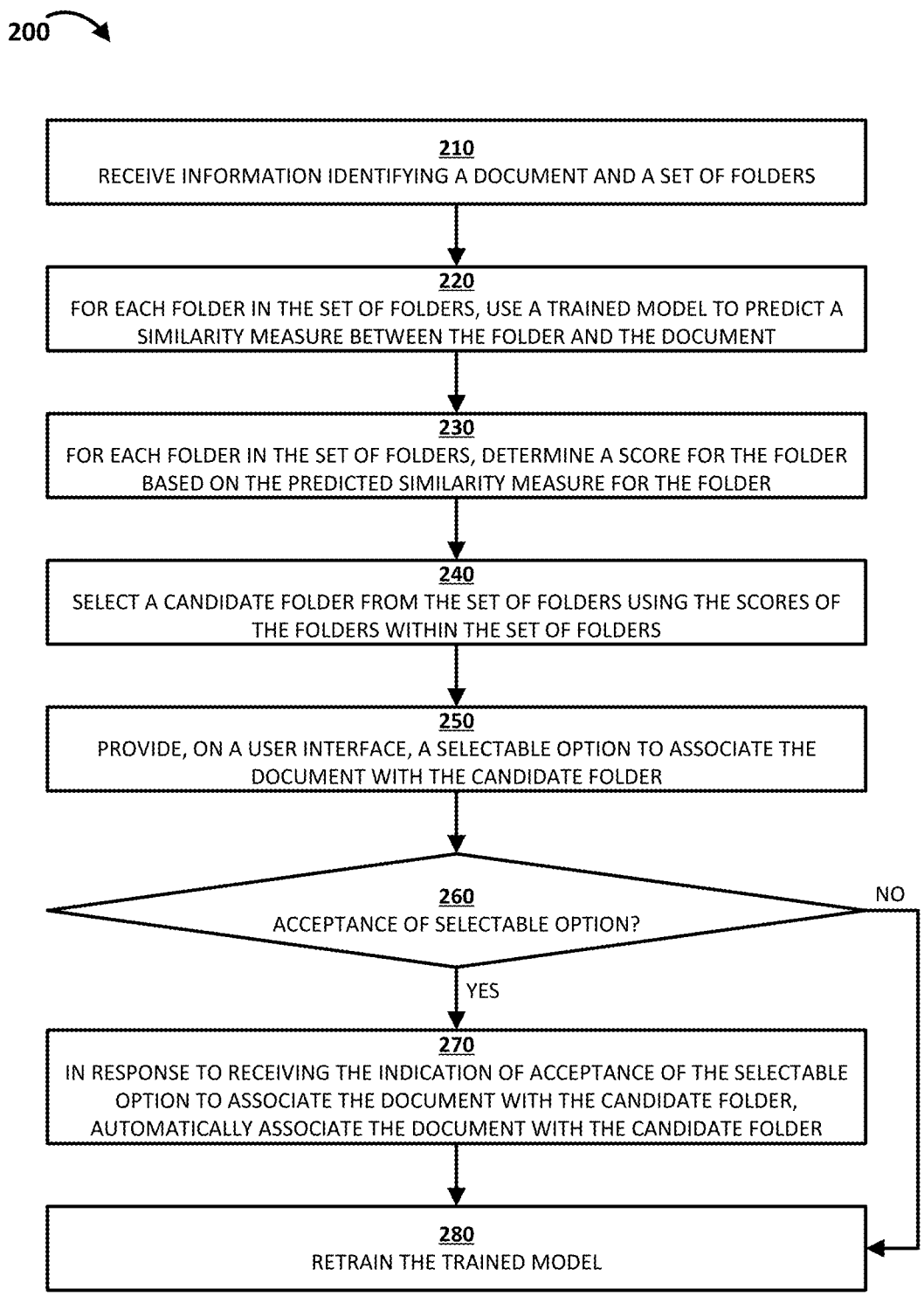
FIG. 2 depicts a flowchart illustrating an example method for practicing selected aspects of the present disclosure.

FIG. 2 is a flowchart illustrating an example method 200 of enabling more computationally efficient organization of files within a cloud storage system, in accordance with implementations disclosed herein. For convenience, the operations of the flowchart are described with reference to a system that performs the operations. This system may include various components of various computer systems, such as one or more components of the cloud storage system 110. Moreover, while operations of method 200 are shown in a particular order, this is not meant to be limiting. One or more operations may be reordered, omitted, or added.

At block 210, the system may receive information identifying a document and a set of folders. In implementations, at block 210, the automatic file organizer 120 of the cloud storage system 110 may receive information identifying a document and a set of folders that are stored in the cloud storage system 110 and/or one or more of the cloud storage servers 130-1, . . . , **130-*n*. In an example, responsive to the document being displayed on and/or selected via a user interface of one of the clients 140-1, . . . , 140-*m*, or responsive to an interaction (e.g., a long tap, or a right click and subsequent selection of a context menu item) with the document via a user interface of one of the clients 140-1, . . . , 140-*m*, the automatic file organizer 120 of the cloud storage system 110 may receive the information identifying the document and the information identifying a set of folders stored in the cloud storage system 110. The automatic file organizer 120 may receive the information identifying the document and the information identifying the set of folders from the cloud storage system 110, one or more of the cloud storage servers 130-1, . . . 130-*n*, and/or one or more of the clients 140-1, . . . , 140-*m***.

Still referring to block 210, the information identifying the document may include a name of the document, a storage location of the document, metadata associated with the document, content of the document, and/or any other information associated with the document. The information identifying the set of folders may include, for each folder in the set of folders, a name of the folder, a storage location of the folder, metadata associated with the folder, content of the folder (e.g., documents that are in the folder), and/or any other information associated with the folder and/or documents that are in the folder.

Still referring to FIG. 2, at block 220, for each folder in the set of folders, the system may use a trained model to predict a similarity measure between the folder and the document. In implementations, at block 220, for each folder in the set of folders identified at block 210, the automatic file organizer 120 of the cloud storage system 110 may use a trained model to predict a similarity measure between the folder and the document identified at block 210, as described in further detail below with respect to FIG. 3. In implementations, the automatic file organizer 120 may use the trained model to predict the similarity measure for each folder by processing, using the trained model, one or more folder features of the folder along with one or more document features of the document and then may generate the similarity measure for the folder based on the processing.

Still referring to FIG. 2, at block 230, for each folder in the set of folders, the system may determine a score for the folder based on the predicted similarity measure for the folder. In implementations, at block 230, for each folder in the set of folders identified at block 210, the automatic file organizer 120 of the cloud storage system 110 may determine a score for the folder based on the similarity measure for the folder that was predicted at block 220.

Still referring to block 230, in some implementations, the score for a particular folder may be the same as or directly correspond to the predicted similarity measure for the folder. In other implementations, the score for a particular folder may be determined based on the similarity measure for the folder and also based on one or more additional factors, such as folder weights. For example, folders that have been more recently and/or frequently accessed by a user may be weighted more heavily as compared to folders that have not been accessed as recently. In this example, if a first folder and a second folder both have the same similarity measure, but the first folder has a relatively higher weight than the second folder because the first folder has been more recently and/or frequently accessed by the user, then the automatic file organizer 120 may determine a relatively higher score for the first folder and a relatively lower score for the second folder. In another example, a number of files in a folder may be used in determining a folder weight (e.g., folders that have fewer files than a first threshold number of files and/or folders that have a larger number of files than a second threshold number of files may be weighted less heavily than other folders).

Still referring to FIG. 2, at block 240, the system may select a candidate folder from the set of folders using the scores of the folders within the set of folders. In implementations, at block 240, the automatic file organizer 120 of the cloud storage system 110 may select a candidate folder from the set of folders identified at block 210 using the scores of the folders within the set of folders that were determined at block 230.

Still referring to block 240, in some implementations, the automatic file organizer 120 may select the candidate folder based on the score for the candidate folder satisfying a threshold. In a case where the scores for multiple candidate folders satisfy the threshold, the automatic file organizer 120 may select the candidate folder having the highest score, or may select the candidate folder using any other criteria. In some implementations, the automatic file organizer 120 may also select one or more additional candidate folders from the set of folders identified at block 210 based on the score(s) of the one or more additional candidate folders satisfying the threshold.

Still referring to block 240, in other implementations, the automatic file organizer 120 may select a new folder as the candidate folder, e.g., in a case where none of the scores of the folders within the set of folders satisfy a threshold. The automatic file organizer 120 may determine a recommended folder name for the new folder.

Still referring to FIG. 2, at block 250, the system may provide, on a user interface, a selectable option to associate the document with the candidate folder. In implementations, at block 250, the automatic file organizer 120 of the cloud storage system 110 may provide, on a user interface, a selectable option to associate the document identified at block 210 with the candidate folder selected at block 240. In the case where the automatic file organizer 120 selected one or more additional candidate folders at block 240, for each of the one or more additional candidate folders, the automatic file organizer 120 may also provide, on the user interface, a selectable option to associate the document with the additional candidate folder.

Still referring to block 250, in other implementations, in a case where, at block 240, the automatic file organizer 120 determined, based on the scores for the folders within the set of folders, an additional candidate folder, the automatic file organizer 120 may determine, based on the score for the additional candidate folder not satisfying a threshold (e.g., a separate threshold from any threshold that may have been used at block 240), to avoid providing, on the user interface, a selectable option to associate the document with the additional candidate folder.

Still referring to block 250, in other implementations, in response to the score for the candidate folder selected at block 240 satisfying a first threshold and satisfying a second threshold, the automatic file organizer 120 may automatically display the selectable option to associate the document with the candidate folder. In response to the score for the candidate folder selected at block 240 satisfying the first threshold but not satisfying the second threshold, the automatic file organizer 120 may only display the selectable option to associate the document with the candidate folder subsequent to receiving, via the user interface, a user input (e.g., a long tap, or a right click and subsequent selection of a context menu item) that is a request to display the selectable option to associate the document with the candidate folder.

Still referring to block 250, in other implementations, the automatic file organizer 120 providing, on the user interface, the selectable option to associate the document with the candidate folder may include providing, on the user interface, an indication that an organization suggestion for the document is available. The indication provided on the user interface may not show the name of the candidate folder. In response to receiving, via the user interface, a user input (e.g., a tap or a click) that is associated with the indication that the organization suggestion for the document is available, the automatic file organizer 120 may provide the selectable option to associate the document with the candidate folder. The selectable option may indicate a name of the candidate folder.

Still referring to FIG. 2, at block 260, the system may determine whether or not an indication of acceptance of the selectable option to associate the document with the candidate folder is received. In implementations, at block 260, the automatic file organizer 120 of the cloud storage system 110 may determine whether or not an input was received via the user interface of one or more of the clients 140-1, . . . , 140-m that is an indication of acceptance of the selectable option, provided at block 250, to associate the document with the candidate folder. In response to the automatic file organizer 120 determining that indication of acceptance of the selectable option to associate the document with the candidate folder is received, flow proceeds to block 270. On the other hand, in response to the automatic file organizer 120 determining that indication of acceptance of the selectable option to associate the document with the candidate folder is not received, flow proceeds to block 280.

Still referring to FIG. 2, at block 270, in response to receiving the indication of acceptance of the selectable option to associate the document with the candidate folder, the system may automatically associate the document with the candidate folder. In implementations, at block 270, in response to receiving the indication of acceptance of the selectable option to associate the document with the candidate folder at block 260, the automatic file organizer 120 of the cloud storage system 110 automatically associates the document identified at block 210 with the candidate folder selected at block 240 and associated with the selectable option that was accepted at block 260.

Still referring to block 270, in some implementations, automatically associating the document with the candidate folder may include moving the document into the candidate folder. In other implementations, automatically associating the document with the candidate folder may include applying a label to the document based on the candidate folder. In yet other implementations, automatically associating the document with the candidate folder may include modifying metadata of the document (e.g., adding a particular flag, or adding/modifying a series of bits that indicate a "location" of the document or a "label" for the document) or modifying an index, table, directory, database, data structure, etc. that indicates folder(s), location(s), label(s), etc. associated with the document. In still other implementations, automatically associating the document with the candidate folder may include physically moving the document to a different storage location (e.g., to a different one of the cloud storage servers 130-1, . . . , 130-n), e.g., to a storage location that is on the same server(s) or geographically proximate server(s) as other documents in the folder.

Still referring to FIG. 2, at block 280, the system may retrain the trained model. In implementations, at block 280, in response to determining that the indication of acceptance of the selectable option to associate the document with the candidate folder was received at block 260, the automatic file organizer 120 may use the indication of acceptance of the selectable option to associate the document with the candidate folder as feedback (e.g., a training label) to retrain the trained model. In other implementations, at block 280, in response to determining that indication of acceptance of the selectable option to associate the document with the candidate folder was not received at block 260, the automatic file organizer 120 may use the indication that the selectable option to associate the document with the candidate folder was not accepted as feedback (e.g., a training label) to retrain the trained model.

Figure 3:
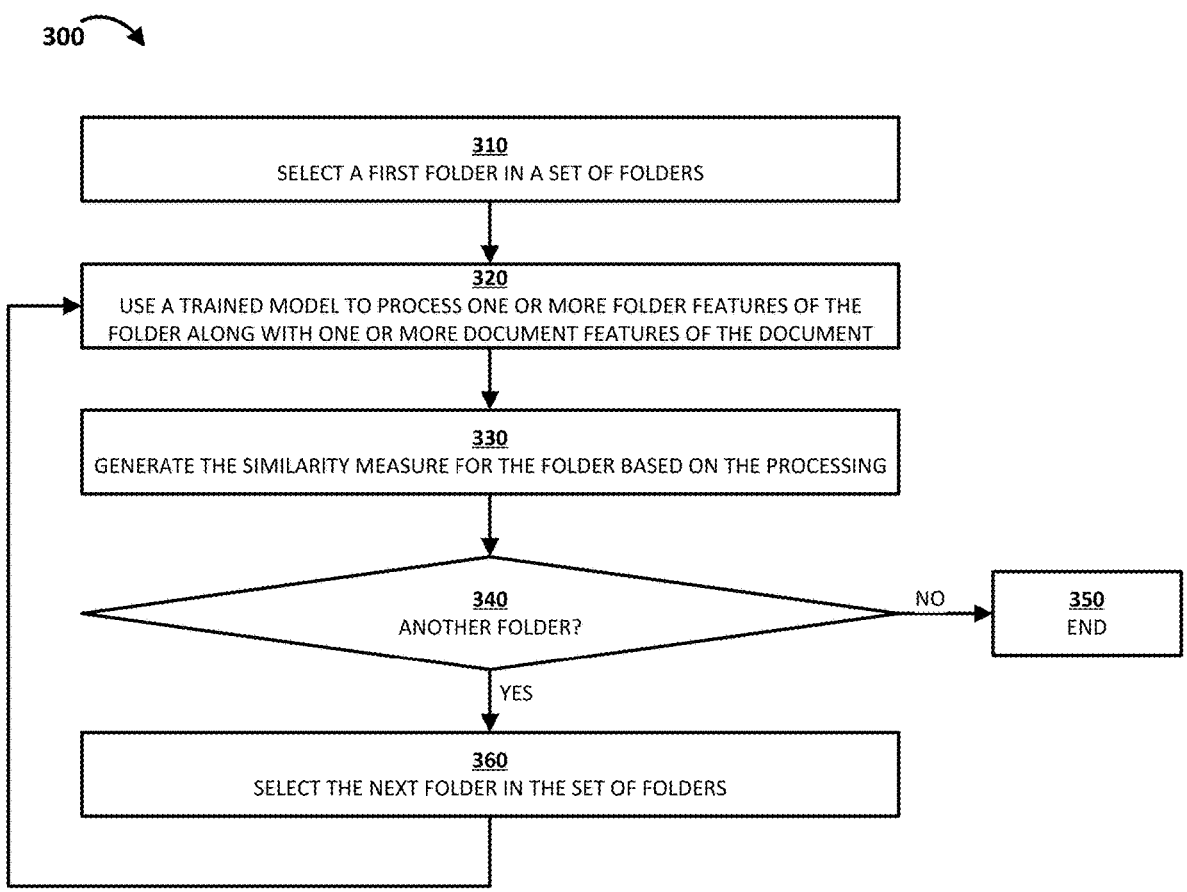
FIG. 3 depicts another flowchart illustrating an example method for practicing selected aspects of the present disclosure.

FIG. 3 is a flowchart illustrating an example method 300 of, for each folder in a set of folders, using a trained model to predict a similarity measure between the folder and the document, in accordance with implementations disclosed herein. For convenience, the operations of the flowchart are described with reference to a system that performs the operations. This system may include various components of various computer systems, such as one or more components of the cloud storage system 110. Moreover, while operations of method 300 are shown in a particular order, this is not meant to be limiting. One or more operations may be reordered, omitted, or added.

At block 310, the system may select a first folder in a set of folders. In implementations, at block 310, the automatic file organizer 120 of the cloud storage system 110 may select a first folder in the set of folders identified at block 210 of FIG. 2.

Still referring to FIG. 3, at block 320, the system may use a trained model to process one or more folder features of the folder along with one or more document features of the document. In implementations, at block 320, the automatic file organizer 120 of the cloud storage system 110 may use a trained model to process one or more folder features of the folder (selected at block 310 or selected at block 360) along with one or more document features of the document (identified at block 210 of FIG. 2).

Still referring to block 320, in some implementations, the automatic file organizer 120 may use a first trained model to process the one or more folder features of the folder and a second trained model to process the one or more document features of the document. In particular, the automatic file organizer 120 may use the first trained model to determine a vector representation (embedding) of the folder (e.g., by applying the one or more folder features of the folder as inputs across the first trained model) and may use the second trained model to determine a vector representation (embedding) of the document (e.g., by applying the one or more document features of the document as inputs across the second trained model). In some implementations, the vector representation of the document and the vector representation of the folder may have the same dimensionality.

In some implementations, the first trained model may be a folder network and the second trained model may be a document network. The first trained model and the second trained model may be trained and retrained/updated independently of each other. The first trained model may be trained, e.g., using a user's folder data which contains information about a user's documents and the folders in which the documents are stored. In particular, document-folder pairs extracted from the user's folder data may be used to train the first trained model. The second trained model may be trained, e.g., using a user's documents.

Still referring to block 320, in other implementations, the automatic file organizer 120 may use the same trained model to process the one or more folder features of the folder and the one or more document features of the document. In particular, the automatic file organizer 120 may use the same trained model to determine a vector representation (embedding) of the folder (e.g., by applying the one or more folder features of the folder as inputs across the trained model) and a vector representation (embedding) of the document (e.g., by applying the one or more document features of the document as inputs across the trained model). In some implementations, the vector representation of the document and the vector representation of the folder may have the same dimensionality.

Still referring to FIG. 3, at block 330, the system may generate the similarity measure for the folder based on the processing. In implementations, at block 330, the automatic file organizer 120 of the cloud storage system 110 may generate the similarity measure for the folder (selected at block 310 or selected at block 360) based on the processing performed at block 320. In particular, the automatic file organizer 120 of the cloud storage system 110 may determine a similarity between the vector representation of the document determined at block 320 and the vector representation of the folder determined at block 320. In some implementations, determining the similarity between the vector representation of the document and the vector representation of the folder may include determining a cosine similarity. In other implementations, other methods may be used to determine the similarity (e.g., distance) between the vector representation of the document and the vector representation of the folder.

Still referring to FIG. 3, at block 340, the system determines whether or not there is another folder in the set of folders that has not yet been selected. In implementations, at block 340, the automatic file organizer 120 of the cloud storage system 110 may determine whether or not there is another folder in the set of folders identified at block 210 of FIG. 2 that has not yet been selected (i.e., selected at block 310 or at block 360). If the automatic file organizer 120 of the cloud storage system 110 determines that there is not another folder in the set of folders identified at block 210 of FIG. 2 that has not yet been selected, then the flow proceeds to block 350 and the flow ends. On the other hand, if the automatic file organizer 120 of the cloud storage system 110 determines that there is another folder in the set of folders identified at block 210 of FIG. 2 that has not yet been selected, then the flow proceeds to block 360.

Still referring to FIG. 3, at block 360, the system may select the next folder in the set of folders. In implementations, at block 360, the automatic file organizer 120 of the cloud storage system 110 may select the next folder (that has not yet been selected) in the set of folders identified at block 210 of FIG. 2. The flow then returns to block 320.

Figure 4:
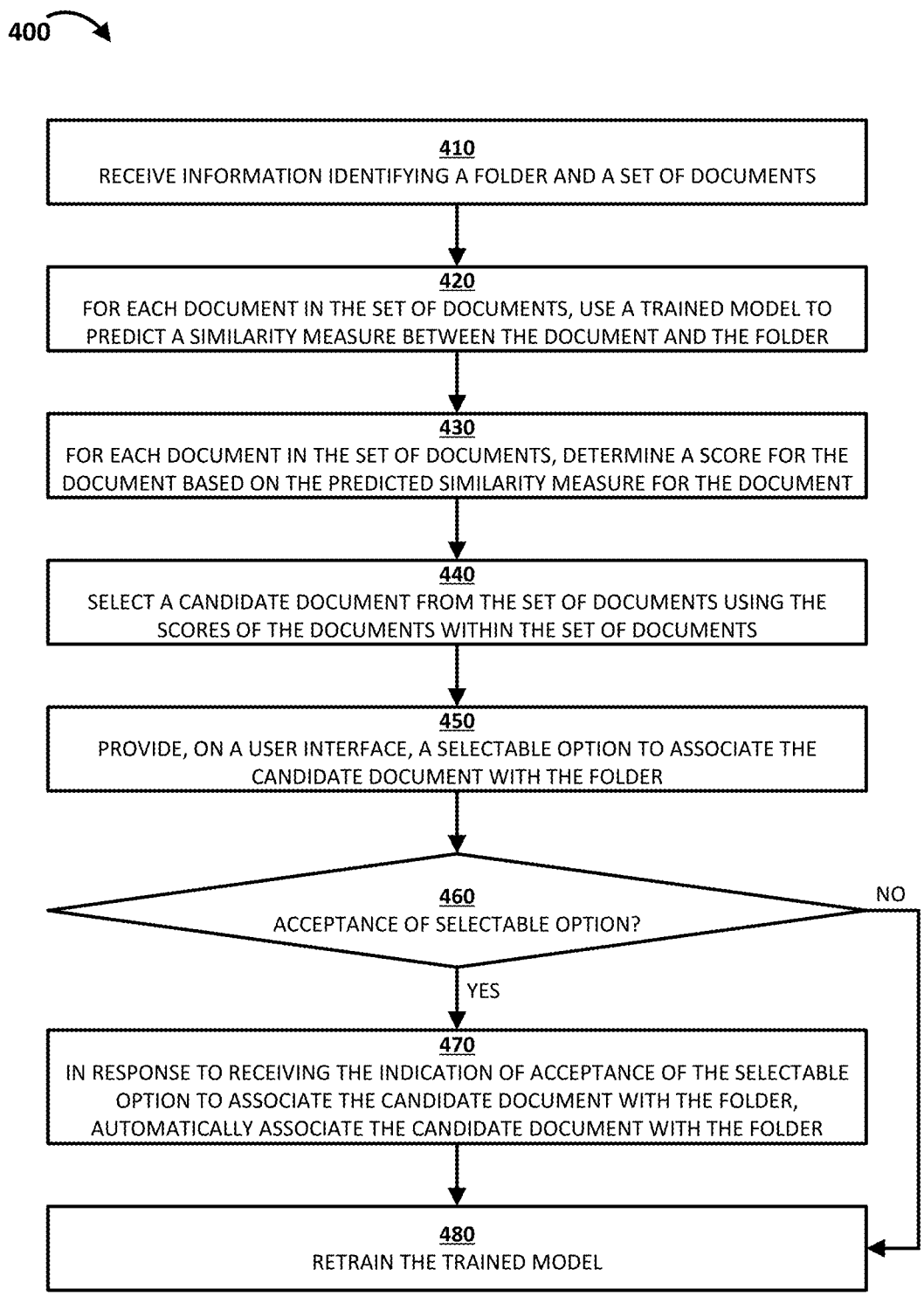
FIG. 4 depicts another flowchart illustrating an example method for practicing selected aspects of the present disclosure.

FIG. 4 is a flowchart illustrating an example method 400 of enabling more computationally efficient organization of files within a cloud storage system, in accordance with implementations disclosed herein. For convenience, the operations of the flowchart are described with reference to a system that performs the operations. This system may include various components of various computer systems, such as one or more components of the cloud storage system 110. Moreover, while operations of method 400 are shown in a particular order, this is not meant to be limiting. One or more operations may be reordered, omitted, or added.

At block 410, the system may receive information identifying a folder and a set of documents. In implementations, at block 410, the automatic file organizer 120 of the cloud storage system 110 may receive information identifying a folder and a set of documents that are stored in the cloud storage system 110 and/or one or more of the cloud storage servers 130-1, . . . , 130-n. In an example, responsive to the folder being displayed on and/or selected via a user interface of one of the clients 140-1, . . . , 140-m, or responsive to an interaction (e.g., a long tap, or a right click and subsequent selection of a context menu item) with the folder via a user interface of one of the clients 140-1, . . . , 140-m, the automatic file organizer 120 of the cloud storage system 110 may receive the information identifying the folder and the information identifying a set of documents stored in the cloud storage system 110. The automatic file organizer 120 may receive the information identifying the folder and the information identifying the set of documents from the cloud storage system 110, one or more of the cloud storage servers 130-1, . . . 130-n, and/or one or more of the clients 140-1, . . . , 140-m.

Still referring to block 410, the information identifying the folder may include a name of the folder, a storage location of the folder, metadata associated with the folder, content of the folder (e.g., documents that are in the folder), and/or any other information associated with the folder and/or documents that are in the folder. The information identifying the set of documents may include, for each document in the set of documents, a name of the document, a storage location of the document, metadata associated with the document, content of the document, and/or any other information associated with the document.

Still referring to FIG. 4, at block 420, for each document in the set of documents, the system may use a trained model to predict a similarity measure between the document and the folder. In implementations, at block 420, for each document in the set of documents identified at block 410, the automatic file organizer 120 of the cloud storage system 110 may use a trained model to predict a similarity measure between the document and the folder identified at block 410, as described in further detail below with respect to FIG. 5. In implementations, the automatic file organizer 120 may use the trained model to predict the similarity measure for each document by processing, using the trained model, one or more document features of the document along with one or more folder features of the folder and then may generate the similarity measure for the document based on the processing.

Still referring to FIG. 4, at block 430, for each document in the set of documents, the system may determine a score for the document based on the predicted similarity measure for the document. In implementations, at block 430, for each document in the set of documents identified at block 410, the automatic file organizer 120 of the cloud storage system 110 may determine a score for the document based on the similarity measure for the document that was predicted at block 420.

Still referring to block 430, in some implementations, the score for a particular document may be the same as or directly correspond to the predicted similarity measure for the document. In other implementations, the score for a particular document may be determined based on the similarity measure for the document and also based on one or more additional factors, such as document weights. For example, documents that have been more recently and/or frequently accessed by a user may be weighted more heavily as compared to documents that have not been accessed as recently and/or frequently. In this example, if a first document and a second document both have the same similarity measure, but the first document has a relatively higher weight than the second document because the first document has been more recently and/or frequently accessed by the user, then the automatic file organizer 120 may determine a relatively higher score for the first document and a relatively lower score for the second document.

Still referring to FIG. 4, at block 440, the system may select a candidate document from the set of documents using the scores of the documents within the set of documents. In implementations, at block 440, the automatic file organizer 120 of the cloud storage system 110 may select a candidate document from the set of documents identified at block 410 using the scores of the documents within the set of documents that were determined at block 430.

Still referring to block 440, in some implementations, the automatic file organizer 120 may select the candidate document based on the score for the candidate document satisfying a threshold. In a case where the scores for multiple candidate documents satisfy the threshold, the automatic file organizer 120 may select the candidate document having the highest score, or may select the candidate document using any other criteria. In some implementations, the automatic file organizer 120 may also select one or more additional candidate documents from the set of documents identified at block 410 based on the score(s) of the one or more additional candidate documents satisfying the threshold.

Still referring to FIG. 4, at block 450, the system may provide, on a user interface, a selectable option to associate the candidate document with the folder. In implementations, at block 450, the automatic file organizer 120 of the cloud storage system 110 may provide, on a user interface, a selectable option to associate the candidate document selected at block 440 with the folder identified at block 410. In the case where the automatic file organizer 120 selected one or more additional candidate documents at block 440, for each of the one or more additional candidate documents, the automatic file organizer 120 may also provide, on the user interface, a selectable option to associate the additional candidate document with the folder.

Still referring to block 450, in other implementations, in a case where, at block 440, the automatic file organizer 120 determined, based on the scores for the documents within the set of documents, an additional candidate document, the automatic file organizer 120 may determine, based on the score for the additional candidate document not satisfying a threshold (e.g., a separate threshold from any threshold that may have been used at block 440), to avoid providing, on the user interface, a selectable option to associate the additional candidate document with the folder.

Still referring to block 450, in other implementations, in response to the score for the candidate document selected at block 440 satisfying a first threshold and satisfying a second threshold, the automatic file organizer 120 may automatically display the selectable option to associate the candidate document with the folder. In response to the score for the candidate document selected at block 440 satisfying the first threshold but not satisfying the second threshold, the automatic file organizer 120 may only display the selectable option to associate the candidate document with the folder subsequent to receiving, via the user interface, a user input (e.g., a long tap, or a right click and subsequent selection of a context menu item) that is a request to display the selectable option to associate the candidate document with the folder.

Still referring to block 450, in other implementations, the automatic file organizer 120 providing, on the user interface, the selectable option to associate the candidate document with the folder may include providing, on the user interface, an indication that an organization suggestion for the folder is available. The indication provided on the user interface may not show the name of the candidate document. In response to receiving, via the user interface, a user input (e.g., a tap or a click) that is associated with the indication that the organization suggestion for the folder is available, the automatic file organizer 120 may provide the selectable option to associate the candidate document with the folder. The selectable option may indicate a name of the candidate document.

Still referring to FIG. 4, at block 460, the system may determine whether or not an indication of acceptance of the selectable option to associate the candidate document with the folder is received. In implementations, at block 460, the automatic file organizer 120 of the cloud storage system 110 may determine whether or not an input was received via the user interface of one or more of the clients 140-1, . . . , 140-*m* that is an indication of acceptance of the selectable option, provided at block 450, to associate the candidate document with the folder. In response to the automatic file organizer 120 determining that indication of acceptance of the selectable option to associate the candidate document with the folder is received, flow proceeds to block 470. On the other hand, in response to the automatic file organizer 120 determining that indication of acceptance of the selectable option to associate the candidate document with the folder is not received, flow proceeds to block 480.

Still referring to FIG. 4, at block 470, in response to receiving the indication of acceptance of the selectable option to associate the candidate document with the folder, the system may automatically associate the candidate document with the folder. In implementations, at block 470, in response to receiving the indication of acceptance of the selectable option to associate the candidate document with the folder at block 460, the automatic file organizer 120 of the cloud storage system 110 automatically associates the candidate document selected at block 440 and associated with the selectable option that was accepted at block 460 with the folder identified at block 410.

Still referring to block 470, in some implementations, automatically associating the candidate document with the folder may include moving the candidate document into the folder. In other implementations, automatically associating the candidate document with the folder may include applying a label to the candidate document based on the folder. In yet other implementations, automatically associating the candidate document with the folder may include modifying metadata of the candidate document (e.g., adding a particular flag, or adding/modifying a series of bits that indicate a "location" of the candidate document or a "label" for the candidate document) or modifying an index, table, directory, database, data structure, etc. that indicates folder(s), location(s), label(s), etc. associated with the candidate document. In still other implementations, automatically associating the candidate document with the folder may include physically moving the candidate document to a different storage location (e.g., to a different one of the cloud storage servers 130-1, . . . , 130-*n*), e.g., to a storage location that is on the same server(s) or geographically proximate server(s) as other documents in the folder.

Still referring to FIG. 4, at block 480, the system may retrain the trained model. In implementations, at block 480, in response to determining that the indication of acceptance of the selectable option to associate the candidate document with the folder was received at block 460, the automatic file organizer 120 may use the indication of acceptance of the selectable option to associate the document with the candidate folder as feedback to retrain the trained model. In other implementations, at block 480, in response to determining that indication of acceptance of the selectable option to associate the document with the candidate folder was not received at block 460, the automatic file organizer 120 may use the indication that the selectable option to associate the document with the candidate folder was not accepted as feedback to retrain the trained model.

Figure 5:
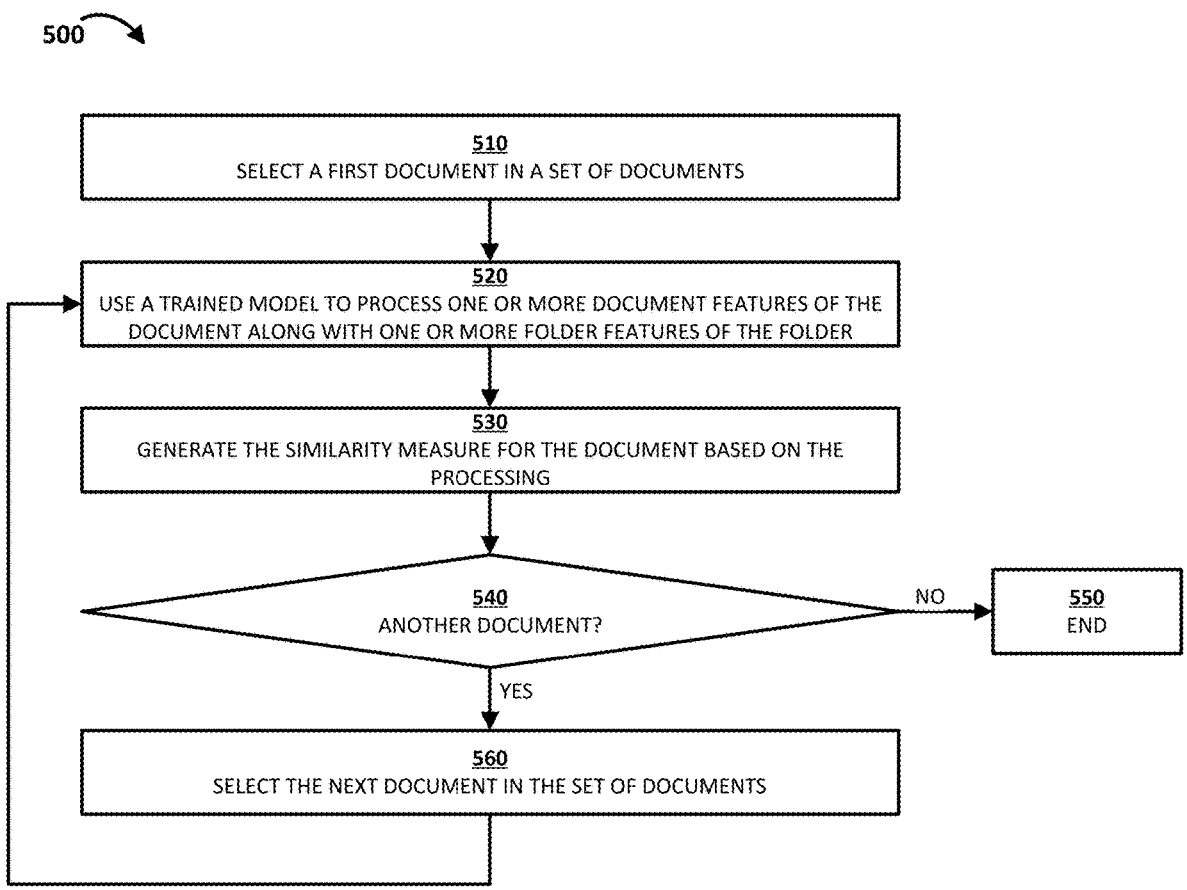
FIG. 5 depicts another flowchart illustrating an example method for practicing selected aspects of the present disclosure.

FIG. 5 is a flowchart illustrating an example method 500 of, for each document in a set of documents, using a trained model to predict a similarity measure between the document and the folder, in accordance with implementations disclosed herein. For convenience, the operations of the flowchart are described with reference to a system that performs the operations. This system may include various components of various computer systems, such as one or more components of the cloud storage system 110. Moreover, while operations of method 500 are shown in a particular order, this is not meant to be limiting. One or more operations may be reordered, omitted, or added.

At block 510, the system may select a first document in a set of documents. In implementations, at block 510, the automatic file organizer 120 of the cloud storage system 110 may select a first document in the set of documents identified at block 410 of FIG. 4.

Still referring to FIG. 5, at block 520, the system may use a trained model to process one or more document features of the document along with one or more folder features of the folder. In implementations, at block 520, the automatic file organizer 120 of the cloud storage system 110 may use a trained model to process one or more document features of the document (selected at block 510 or selected at block 560) along with one or more folder features of the folder (identified at block 410 of FIG. 4).

Still referring to block 520, in some implementations, the automatic file organizer 120 may use a first trained model to process the one or more document features of the document and a second trained model to process the one or more folder features of the folder. In particular, the automatic file organizer 120 may use the first trained model to determine a vector representation (embedding) of the document (e.g., by applying the one or more document features of the document as inputs across the first trained model) and may use the second trained model to determine a vector representation (embedding) of the folder (e.g., by applying the one or more folder features of the folder as inputs across the second trained model). In some implementations, the vector representation of the document and the vector representation of the folder may have the same dimensionality.

Still referring to block 520, in other implementations, the automatic file organizer 120 may use the same trained model to process the one or more document features of the document and the one or more folder features of the folder. In particular, the automatic file organizer 120 may use the same trained model to determine a vector representation (embedding) of the document (e.g., by applying the one or more document features of the document as inputs across the trained model) and a vector representation (embedding) of the folder (e.g., by applying the one or more folder features of the folder as inputs across the trained model). In some implementations, the vector representation of the document and the vector representation of the folder may have the same dimensionality.

Still referring to FIG. 5, at block 530, the system may generate the similarity measure for the document based on the processing. In implementations, at block 530, the automatic file organizer 120 of the cloud storage system 110 may generate the similarity measure for the document (selected at block 510 or selected at block 560) based on the processing performed at block 520. In particular, the automatic file organizer 120 of the cloud storage system 110 may determine a similarity between the vector representation of the document determined at block 520 and the vector representation of the folder determined at block 520. In some implementations, determining the similarity between the vector representation of the document and the vector representation of the folder may include determining a cosine similarity. In other implementations, other methods may be used to determine the similarity (e.g., distance) between the vector representation of the document and the vector representation of the folder.

Still referring to FIG. 5, at block 540, the system determines whether or not there is another document in the set of documents that has not yet been selected. In implementations, at block 540, the automatic file organizer 120 of the cloud storage system 110 may determine whether or not there is another document in the set of documents identified at block 410 of FIG. 4 that has not yet been selected (i.e., selected at block 510 or at block 560). If the automatic file organizer 120 of the cloud storage system 110 determines that there is not another document in the set of documents identified at block 410 of FIG. 4 that has not yet been selected, then the flow proceeds to block 550 and the flow ends. On the other hand, if the automatic file organizer 120 of the cloud storage system 110 determines that there is another document in the set of documents identified at block 410 of FIG. 4 that has not yet been selected, then the flow proceeds to block 560.

Still referring to FIG. 5, at block 560, the system may select the next document in the set of documents. In implementations, at block 560, the automatic file organizer 120 of the cloud storage system 110 may select the next document (that has not yet been selected) in the set of documents identified at block 410 of FIG. 4. The flow then returns to block 520.

Figure 6A:
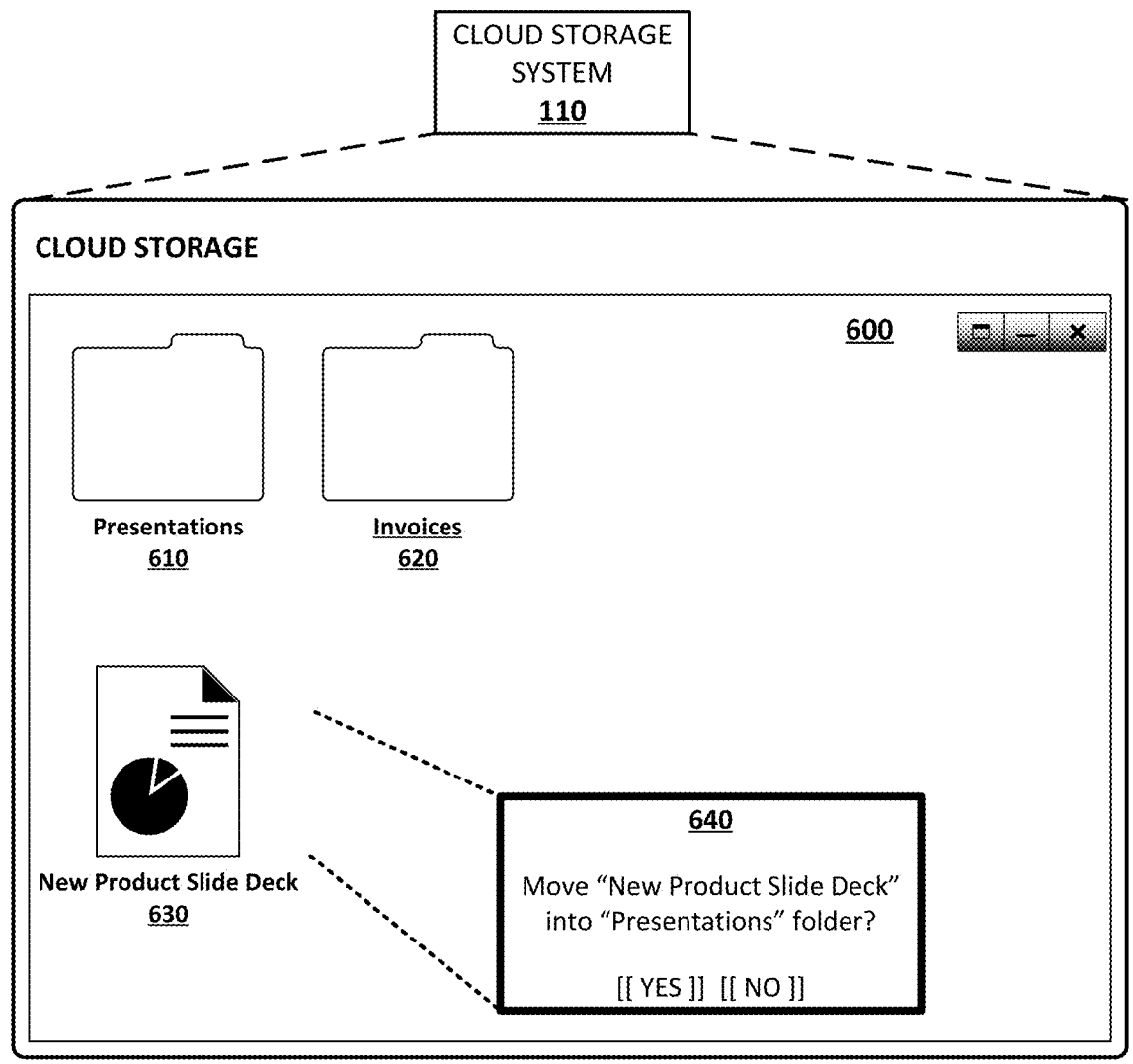
FIG. 6A and FIG. 6B depict example applications of techniques described herein, in accordance with various implementations.

FIG. 6A depicts an example of automatic file organization within a cloud storage system 110. The scenario of FIG. 6A is for illustrative purposes only. At bottom, a graphical user interface ("GUI") 600 of a cloud storage application implemented by the cloud storage system 110 is depicted. The GUI 600 may be used by a user of the cloud storage application to create, store, access, and/or modify documents, such as document 630, stored in the cloud storage system 110. Documents that are created, stored, accessed, and/or modified by one or more of the clients 140-1, . . . , 140-m using the cloud storage application that is implemented by the cloud storage system 110 may be optionally organized into folders, such as folder 610 and folder 620.

In some implementations, as described with respect to block 250 of FIG. 2, the automatic file organizer 120 of the cloud storage system 110 may provide, on the GUI 600, a selectable option 640 to associate document 630 ("New Product Slide Deck"), which may have been a document identified at block 210 of FIG. 2, with the folder 610 ("Presentations"), which may be the candidate folder selected at block 240 of FIG. 2. In response to receiving an indication of acceptance of the selectable option to associate the document 630 with the folder 610 (e.g., a tap or click on "Yes" in the selectable option 640), the automatic file organizer 120 of the cloud storage system 110 may automatically associate the document 630 with the folder 610. On the other hand, in response to receiving an indication that the selectable option to associate the document 630 with the folder 610 is not accepted (e.g., a tap or click on "No" in the selectable option 640), the automatic file organizer 120 of the cloud storage system 110 may not associate the document 630 with the folder 610.

Figure 6B:
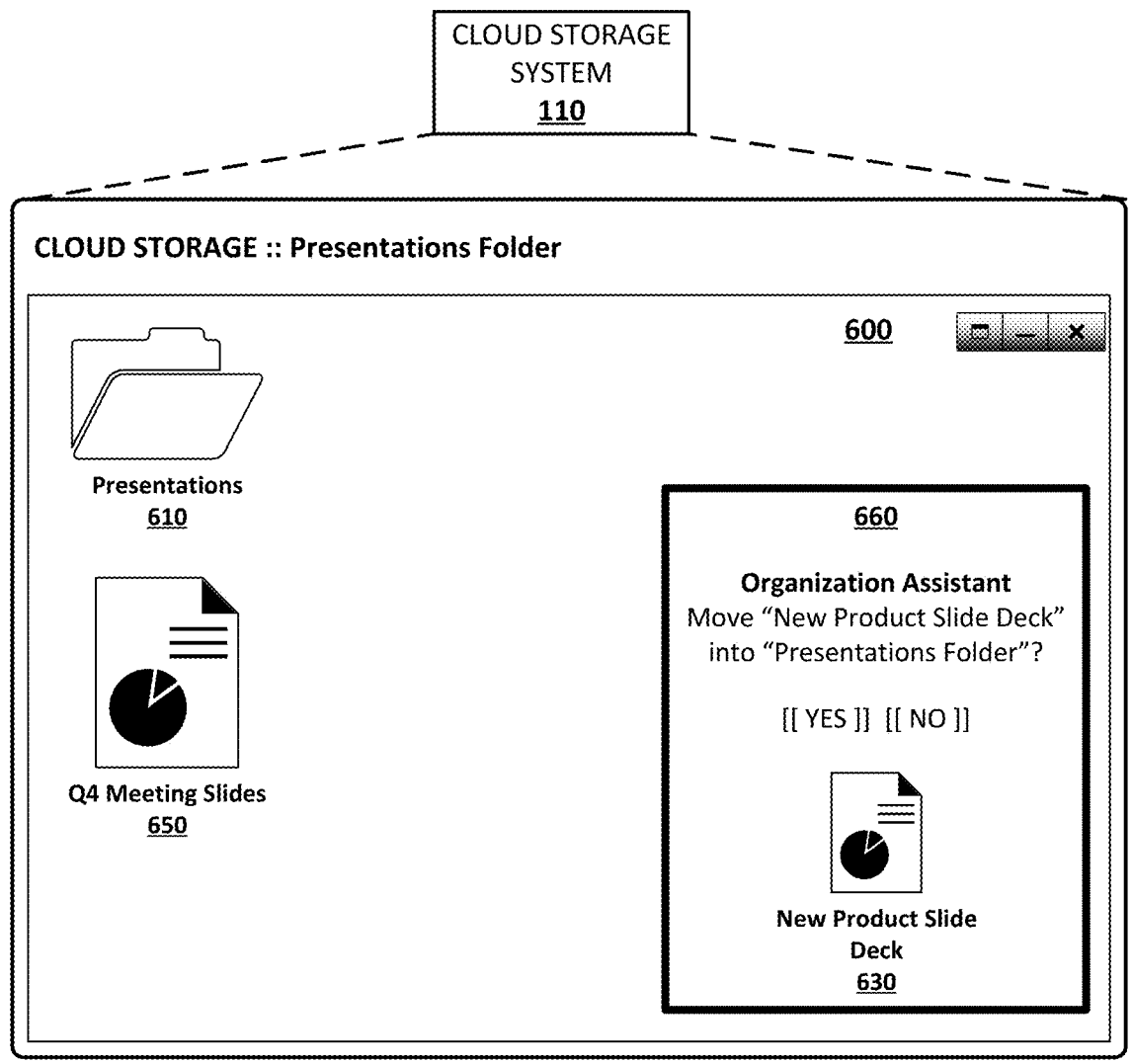

FIG. 6B depicts another example of automatic file organization within a cloud storage system 110. The scenario of FIG. 6B is for illustrative purposes only. At bottom, a graphical user interface ("GUI") 600 of a cloud storage application implemented by the cloud storage system 110 is depicted. The GUI 600 may be used by a user of the cloud storage application to create, store, access, and/or modify documents, such as document 650, stored in the cloud storage system 110. Documents that are created, stored, accessed, and/or modified by one or more of the clients 140-1, . . . , 140-m using the cloud storage application that is implemented by the cloud storage system 110 may be optionally organized into folders, such as folder 610.

In some implementations, as described with respect to block 450 of FIG. 4, the automatic file organizer 120 of the cloud storage system 110 may provide, on the GUI 600, a selectable option 660 to move the candidate document 630 ("New Product Slide Deck"), selected at block 440 of FIG. 4, into the folder 610 ("Presentations"), which may be the folder identified at block 410 of FIG. 4. In response to receiving an indication of acceptance of the selectable option 660 to move the document 630 into the folder 610 (e.g., a tap or click on "Yes" in the selectable option 660), the automatic file organizer 120 of the cloud storage system 110 may automatically move the document 630 into the folder 610. On the other hand, in response to receiving an indication that the selectable option to move the document 630 into the folder 610 is not accepted (e.g., a tap or click on "No" in the selectable option 660), the automatic file organizer 120 of the cloud storage system 110 may not move the document 630 into the folder 610.

Figure 7:
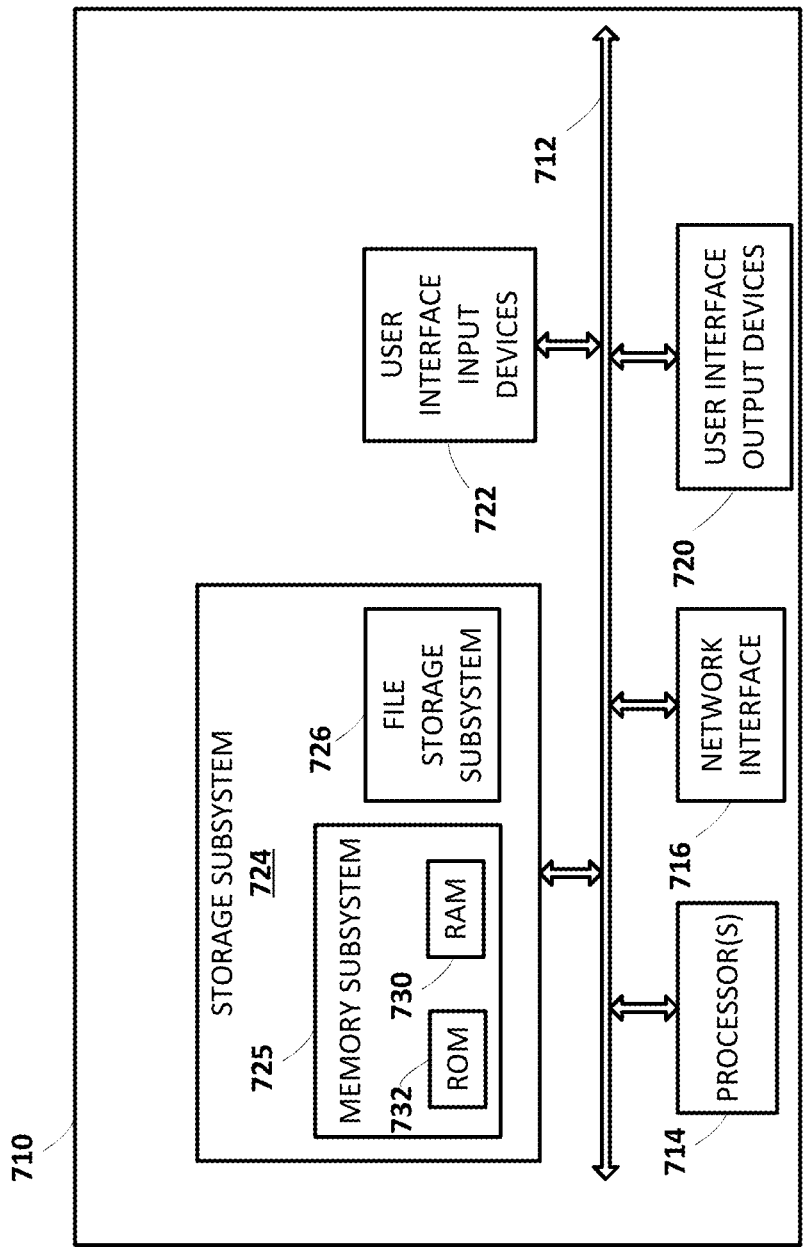
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 2, 3, 4, and 5, as well as to implement various components depicted in FIG. 1.

These software modules are generally executed by processor 714 alone or in combination with other processors. The memory subsystem 725 included in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
  receiving information identifying a document and a set of folders;
  for each folder in the set of folders, using a trained model to predict a similarity measure between the folder and the document, wherein using the trained model to predict the similarity measure for each folder comprises:
    processing, using the trained model, one or more folder features of the folder along with one or more document features of the document; and
    generating the similarity measure for the folder based on the processing;
  for each folder in the set of folders, determining a score for the folder based on the predicted similarity measure for the folder and a folder weight, wherein the folder weight is based on a frequency of access for the folder or a number of files in the folder;
  selecting a candidate folder from the set of folders using the scores of the folders within the set of folders;
  providing, on a user interface, a selectable option to associate the document with the candidate folder;

receiving an indication of acceptance of the selectable option to associate the document with the candidate folder; and in response to (i) providing the selectable option to associate the document with the candidate folder and (ii) receiving the indication of acceptance of the selectable option to associate the document with the candidate folder, labeling the document with a training label based on the indication of acceptance of the selectable option to associate the document with the candidate folder, and using the document labeled with the training label to further train the trained model.

2. The method according to claim 1, further comprising:
in response to receiving the indication of acceptance of the selectable option to associate the document with the candidate folder, automatically associating the document with the candidate folder.

3. The method according to claim 2, wherein automatically associating the document with the candidate folder comprises moving the document into the candidate folder.

4. The method according to claim 2, wherein automatically associating the document with the candidate folder comprises applying a label to the document based on the candidate folder.

5. The method according to claim 1, wherein the document and the set of folders are stored on a cloud storage system.

6. The method according to claim 1, wherein processing, using the trained model, the one or more folder features of the folder along with the one or more document features of the document comprises:
determining a vector representation of the document; and
determining a vector representation of the folder, and
wherein generating the similarity measure for the folder based on the processing comprises determining a similarity between the vector representation of the document and the vector representation of the folder.

7. The method according to claim 6, wherein the vector representation of the document and the vector representation of the folder have a same dimensionality.

8. The method according to claim 6, wherein determining the similarity between the vector representation of the document and the vector representation of the folder comprises determining a cosine similarity.

9. The method according to claim 1, wherein selecting the candidate folder from the set of folders using the scores of the folders within the set of folders comprises selecting the candidate folder based on the score for the candidate folder satisfying a threshold.

10. The method according to claim 1, further comprising:
selecting at least one additional candidate folder from the set of folders based on, for each of the at least one additional candidate folder, the score for the additional candidate folder satisfying the threshold; and
providing, on the user interface, for each of the at least one additional candidate folder, a selectable option to associate the document with the additional candidate folder.

11. The method according to claim 1, further comprising:
determining, based on the scores for the folders within the set of folders, an additional candidate folder; and
avoiding providing, on the user interface, a selectable option to associate the document with the additional candidate folder based on the score for the additional candidate folder not satisfying a threshold.

12. The method according to claim 1, wherein providing, on the user interface, the selectable option to associate the document with the candidate folder comprises:
in response to the score for the candidate folder satisfying a first threshold and satisfying a second threshold, automatically displaying the selectable option to associate the document with the candidate folder; and
in response to the score for the candidate folder satisfying the first threshold but not satisfying the second threshold, only displaying the selectable option to associate the document with the candidate folder subsequent to receiving, via the user interface, a user input that is a request to display the selectable option to associate the document with the candidate folder.

13. The method according to claim 1, wherein providing, on the user interface, the selectable option to associate the document with the candidate folder comprises:
providing, on the user interface, an indication that an organization suggestion for the document is available; and
in response to receiving, via the user interface, a user input that is associated with the indication that the organization suggestion for the document is available, providing the selectable option to associate the document with the candidate folder, wherein the selectable option indicates a name of the candidate folder.

14. A computer program product comprising one or more non-transitory computer-readable storage media having program instructions collectively stored on the one or more non-transitory computer-readable storage media, the program instructions executable to:
receive information identifying a folder and a set of documents;
for each document in the set of documents, use a trained model to predict a similarity measure between the document and the folder, wherein using the trained model to predict the similarity measure for each document comprises:
processing, using the trained model, one or more document features of the document along with one or more folder features of the folder; and
generating the similarity measure for the document based on the processing;
for each document in the set of documents, determine a score for the document based on the predicted similarity measure for the document and a folder weight, wherein the folder weight is based on a frequency of access for the folder or a number of files in the folder;
select a candidate document from the set of documents using the scores of the documents within the set of documents;
provide, on a user interface, a selectable option to associate the candidate document with the folder;
receive an indication of acceptance of the selectable option to associate the candidate document with the folder; and
in response to (i) providing the selectable option to associate the candidate document with the folder and (ii) receiving the indication of acceptance of the selectable option to associate the candidate document with the folder, labeling the document with a training label based on the indication of acceptance of the selectable option to associate the candidate document with the folder, and using the document labeled with the training label to further train the trained model.

15. The computer program product according to claim 14, the program instructions further being executable to:
in response to receiving the indication of acceptance of the selectable option to associate the candidate document with the folder, automatically associate the candidate document with the folder.

16. The computer program product according to claim 15, wherein automatically associating the candidate document with the folder comprises moving the candidate document into the folder.

17. The computer program product according to claim 15, wherein automatically associating the candidate document with the folder comprises applying a label to the candidate document based on the folder.

18. A system comprising:
a processor, a computer-readable memory, one or more computer-readable storage media, and program instructions collectively stored on the one or more computer-readable storage media, the program instructions executable to:
receive information identifying a document and a set of folders;
for each folder in the set of folders, use a trained model to predict a similarity measure between the folder and the document, wherein using the trained model to predict the similarity measure for each folder comprises:
processing, using the trained model, one or more folder features of the folder along with one or more document features of the document; and
generating the similarity measure for the folder based on the processing;
for each folder in the set of folders, determine a score for the folder based on the predicted similarity measure for the folder and a folder weight, wherein the folder weight is based on a frequency of access for the folder or a number of files in the folder;
select a candidate folder from the set of folders using the scores of the folders within the set of folders;
provide, on a user interface, a selectable option to associate the document with the candidate folder;
receive an indication of acceptance of the selectable option to associate the document with the candidate folder; and
in response to (i) providing the selectable option to associate the document with the candidate folder and (ii) receiving the indication of acceptance of the selectable option to associate the document with the candidate folder, labeling the document with a training label based on the indication of acceptance of the selectable option to associate the document with the candidate folder, and using the document labeled with the training label to further train the trained model.

19. The method according to claim 1, wherein, for each folder in the set of folders, the folder weight is further based on a recency of access for the folder.

* * * * *